United States Patent [19]

Tanaka

[11] Patent Number: 5,380,096
[45] Date of Patent: Jan. 10, 1995

[54] LINEAR MOTION ROLLING GUIDE UNIT WITH FLOW VALVE IN COMMUNICATING OIL GROOVE

[75] Inventor: Kazuhiko Tanaka, Fuchu, Japan

[73] Assignee: Nippon Thompson Co., Ltd., Tokyo, Japan

[21] Appl. No.: 134,811

[22] Filed: Oct. 12, 1993

[30] Foreign Application Priority Data

Oct. 12, 1992 [JP] Japan .................. 4-076968[U]

[51] Int. Cl.⁶ .................. F16C 33/10; F16C 29/06
[52] U.S. Cl. .................. 384/13; 384/44; 384/45
[58] Field of Search .................. 384/13, 43, 44, 45

[56] References Cited

U.S. PATENT DOCUMENTS

| | | | |
|---|---|---|---|
| 4,582,369 | 4/1986 | Itoh | 384/13 |
| 4,850,720 | 7/1989 | Osawa | 384/13 |
| 5,129,736 | 7/1992 | Tanaka | 384/45 |
| 5,139,347 | 8/1992 | Hattori | 384/45 X |
| 5,265,963 | 11/1993 | Kawaguchi | 384/45 X |

*Primary Examiner*—Thomas R. Hannon
*Attorney, Agent, or Firm*—Browdy and Neimark

[57] ABSTRACT

The linear motion rolling guide unit includes a track rail, a casing slidable with respect to the track rail, end caps mounted to the ends of the casing, and flow regulating valves installed in oil grooves formed in the end caps. When the linear motion rolling guide unit is used in an inclined condition with the right side tilted downward, the flow regulating valves may be turned clockwise to limit the flow of lubricating oil to the raceways on the right side. This makes the amounts of oil supplied to the left- and right-side raceways equal even when the linear motion rolling guide unit is used in other than a horizontal attitude, assuring good lubrication.

6 Claims, 4 Drawing Sheets

LINEAR MOTION ROLLING GUIDE UNIT WITH FLOW VALVE IN COMMUNICATING OIL GROOVE

BACKGROUND OF THE INVENTION

1. Field of the Invention

The present invention relates to a linear motion rolling guide unit suitably applied for machine tools, industrial robots, precision processing equipment and testing equipment, in which sliders slide on track rails with a number of rolling elements interposed therebetween.

2. Description of the Prior Art

Linear motion rolling guide units generally have sliders mounted astride track rails with a large number of rolling elements interposed therebetween so that the sliders can slide on the track rails. Such linear motion rolling guide units are available in a variety of types. As an example of such a linear motion rolling guide unit, a four-raceway endless linear motion rolling guide unit will be explained by referring to FIG. 1 to FIG. 4.

The four-raceway endless linear motion rolling guide unit has a track rail 1 with a substantially I-shaped cross section, a slider 2 straddling the track rail 1 in such a way that it can move relative to or slide on the track rail 1, and a number of cylindrical rolls 3 rotatably interposed between the track rail 1 and the slider 2. The track rail 1 is formed with recessed grooves 8 extending longitudinally on both sides 18 thereof, which form raceway surfaces 5, 6. The recessed grooves 8 of the track rail 1 are formed at the upper and lower edges thereof with longitudinally extending, inclined upper and lower raceway surfaces 5, 6 respectively. The slider 2 has a casing 4 which is formed with a recessed portion 10 so that the casing can straddle the track rail 1, and end caps 7 attached to both longitudinal ends of the casing 4. To seal the boundary between the track rail 1 and the slider 2 when the slider 2 slides on the track rail 1, the ends of the end caps 7 are each provided with an end seal 20 and the underside of the slider 2 with an under seal 22.

The recessed portion 10 of the casing 4 is formed with a longitudinally extending upper raceway surface 11 and a lower raceway surface 12 at locations facing the upper raceway surface 5 and the lower raceway surface 6 of the track rail 1. Between the upper raceway surface 11 and the lower raceway surface 12 of the casing 4 is formed an engagement groove 15, which receives an engagement projection 16 formed on the retainer 9. The retainer 9 has one part thereof loosely fitted in the recessed groove 8 of the track rail 1 and is fixed to the casing 4 by bolts 17.

In the above construction of the 4-raceway endless linear motion rolling guide unit, two raceways X1, X2 are formed on each side of the track rail 1, one between the upper raceway surface 5 on the track rail 1 and the upper raceway surface 11 on the casing and the other between the lower raceway surface 6 on the track rail 1 and the lower raceway surface 12 on the casing 4. Hence, a total of four raceways are formed on both sides of the track rail 1. In these roller raceways, a number of cylindrical rollers 3 roll in contact with the facing raceway surfaces 5, 11/6, 12. The casing 4 is formed with return passages 13, 14, and the end caps 7 are formed with direction changing passages 25, 26 that connect the roller raceways and the return passages 13, 14.

These direction changing passages are explained by referring to FIG. 8. The end surfaces of the end caps 7 are formed with two direction changing passages 23, 24/25, 26 on each side of the track rail 1 that cross each other without interference. Thus, as the slider 2 slides on the track rail 1, a number of cylindrical rollers 3 trapped between, for example, the facing raceway surfaces 5 and 11 are led into the direction changing passage 23 and then into the return passage 13, circulating in an endless circulation path. Likewise, a number of cylindrical rollers 3 trapped between the facing raceway surfaces 6 and 12 move into the direction changing passage 24 and into the return passage 14, circulating in an endless circulation path. The same applies to the direction changing passages 25, 26 and their explanation is omitted.

The end cap 7 is provided with an end seal 20 that seals the gap between the track rail 1 and the slider 2, and is formed with oil supply ports 27, 28 and oil grooves for feeding lubricating oil to the raceways X1, X2 between the raceway surfaces 5 and 11/6 and 12 on the track rail 1 and the slider 2. The oil supply ports 27, 28 are provided on each side of the end cap 7 so that lubricating oil can be supplied from either side.

The oil groove comprises: a first oil groove 29 that extends from the oil supply ports 27, 28 on the left and right side toward the center of the end cap 7; a second oil groove 30 that supplies lubricating oil to the raceway surfaces 5, 6 formed on the side wall surface 18 of the track rail 1; and a communicating oil groove 31 that connects the first oil groove 29 and the second oil groove 30. The communication oil groove 31 is located on the center line of the end cap 7. The lubricating oil supplied from one oil supply port 27 passes, as indicated by arrows 32, 33, 34, through the first oil groove 29 formed in the end cap 7, branches at the communicating oil groove 31 and from there flows through the second oil groove 30 to the raceways X1, X2 on the left and right side of the track rail.

Described above is the construction of the conventional 4-raceway endless linear motion rolling guide unit, with the slider 2 normally placed on a horizontal surface for sliding. That is, the first oil groove 29 and the second oil groove 30 are kept horizontal during use, as shown in FIG. 8. As application of the linear motion rolling guide unit widens, a need arises to use the linear motion rolling guide unit in a vertical position or in an inclined position.

Let us consider a case where the conventional linear motion rolling guide unit is used in an inclined attitude, for example, with the right side tilted downward in FIG. 8. When the lubricating oil is led through the first oil groove 29 into the communicating oil groove 31 and from there into the second oil groove 30, the oil is affected by gravity and flows mainly in the direction of arrow 33, with the result that the oil flow toward the direction of arrow 34 tends to be insufficient. That is, of the raceways located on the left side and right side of the track rail 1, the raceway positioned relatively higher will be supplied with a smaller amount of lubricating oil. In other words, only one side of the track rail is lubricated. Since the raceways are the portions that bear heavy loads, it is an important issue that should be addressed how to prevent the one-side lubrication or how to supply oil in equal amounts to the left and right side raceways.

SUMMARY OF THE INVENTION

A primary objective of this invention is to solve the above-mentioned problems and to provide a linear motion rolling guide unit, which, when used in other than the horizontal attitude, for example, in an inclined attitude, prevents imbalance in the amount of lubricating oil supplied between a raceway at a higher position and a raceway at a lower position to lubricate well the raceways between the track rail and the slider.

It is an object of this invention to provide a linear motion rolling guide unit, which includes:
- a track rail having first raceway surfaces formed on longitudinally extending side wall surfaces thereof;
- a casing slidable relative to the track rail and having second raceway surfaces formed at positions facing the first raceway surfaces;
- end caps mounted to the longitudinal ends of the casing;
- a number of rolling elements that roll and circulate through raceways formed between the facing first and second raceway surfaces, through direction changing passages formed in the end caps and through return passages formed in the casing;
- oil supply ports formed in the end caps for introducing lubricating oil;
- oil grooves formed in the end caps and extending from the oil supply ports to the central portion of the end cap;
- branching oil grooves formed in the end caps that branch the oil grooves and connect them to the raceways on both sides; and
- flow regulating valves installed in the branching portions of the oil grooves to distribute lubricating oil to the raceways.

In this linear motion rolling guide unit, the cross sectional areas of the branching oil grooves communicating with the raceways on one side differ from those of the branching oil grooves communicating with the raceways on the other side. That is, the linear motion rolling guide unit of this invention has the oil grooves so formed that the width and/or depth of the oil grooves communicating with the left-side raceways differ from those of the oil grooves communicating with the right-side raceways. The cross sectional areas of the oil grooves leading to the raceways located at lower positions are made smaller than those of the oil grooves leading to the raceways located at higher positions. Since the sizes of the oil grooves are determined in accordance with the inclination angle at which the linear motion rolling guide unit is used, the use of the unit at other than the intended inclination angle does not produce desired effects.

Another feature of this invention is that the end cap is provided with a plurality of the oil supply ports and the oil grooves so that lubricating oil can be supplied to the raceways independently of each other. That is, in this linear motion rolling guide unit, the oil grooves communicating with the left-side raceways are separated from those communicating with the right-side raceways.

A further feature of this invention is that since the flow regulating valves for distributing lubricating oil to the raceways are installed at the branching points in the oil grooves, it is possible to adjust the amounts of lubricating oil supplied to the left- and right-side raceways by the action of the flow regulating valves. Therefore, when the linear motion rolling guide unit is used in other than a horizontal attitude, as in an inclined condition, the flow regulating valve is adjusted so that the cross sectional areas of the oil grooves communicating with the raceways located at lower positions are smaller than those of the oil grooves communicating with the raceways located at higher positions, thereby making equal the amounts of lubricating oil supplied to the left- and right-side raceways located at higher and lower positions. As a result, it is possible to avoid such a problem as experienced with the conventional units that the lubricating oil can only reach the raceways on one side. In other words, this invention eliminates problems related to one-side lubrication. Furthermore, this invention permits application of the linear motion rolling guide unit under various conditions by simple adjustment of the flow regulating valves on the part of the user.

This linear motion rolling guide unit has the oil grooves formed in such a way that the cross sectional areas of the oil grooves communicating with the left- and right-side raceways differ from each other, i.e. when the rolling guide unit is used in an inclined or vertical state, the cross sectional areas of the oil grooves leading to the raceways located at higher positions are set larger than those of the oil grooves leading to the raceways located at lower positions. This makes equal the amounts of lubricating oil supplied to the raceways at the higher positions and the raceways at the lower positions. Therefore, if used in conditions that are incorporated into the design, the linear motion rolling guide unit will provide good lubrication.

Further, since this linear motion rolling guide unit is so constructed that the lubricating oil is supplied to the left- and right-side raceways independently of each other, there is a following advantage. That is, when the unit is used in an inclined or vertical condition, the supply of lubricating oil to the higher-position raceways and the lower-position raceways can be done through separate systems, allowing the adjustment on the lubricating oil supply to be performed for the left-and right-side raceways individually. This in turn makes it possible to equalize the amounts of oil supplied to the left- and light-side raceways.

As mentioned above, the linear motion rolling guide unit of this invention can be used in other than the horizontal attitude, for example, in inclined and vertical attitudes, increasing the range of application.

DETAILED DESCRIPTION OF EMBODIMENTS

Now, by referring to the accompanying drawings, an embodiment of the linear motion rolling guide unit according to this invention will be described. The linear motion rolling guide unit of this invention has basically the same construction as the conventional 4-raceway endless linear motion rolling guide unit as shown in FIGS. 1, 2 and 3, and is characterized by a flow regulating valve provided in the oil groove in the end cap 7.

Figure 1:
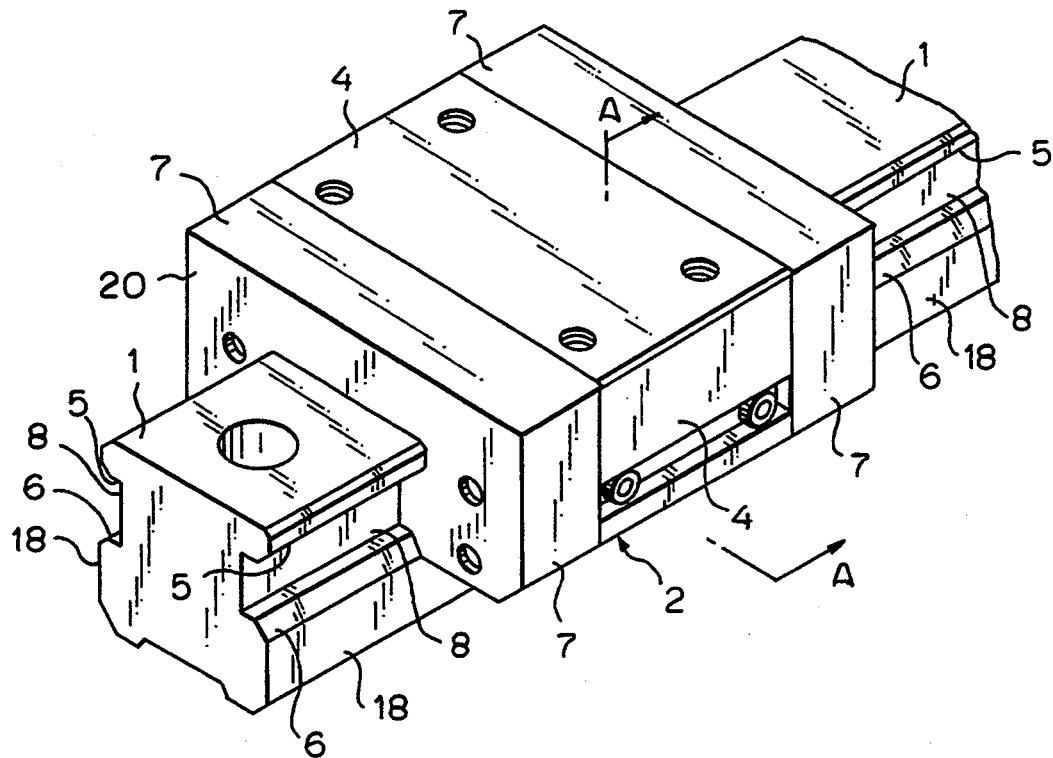
FIG. 1 is a perspective view of a 4-raceway endless linear motion rolling guide unit as one embodiment of the linear motion rolling guide unit according to this invention.

Like the one shown in FIG. 1, the linear motion rolling guide unit of this invention has a track rail 1 and a slider 2. The track rail 1 is formed with recessed grooves 8 extending longitudinally on both side wall surfaces 18, each forming an upper raceway surface 5 and a lower raceway surface 6. The slider 2 straddles the track rail 1 in such a way that it can slide on the track rail 1. The slider includes: a casing 4 which is slidable on the track rail 1 and which has upper raceway surfaces 11 formed thereon at positions facing the upper raceway surfaces 5 and lower raceway surfaces 12 at positions facing the lower raceway surfaces 6; end caps 7 attached to the longitudinal ends of the casing 4; engagement grooves 15 formed in the casing 4 between the raceway surfaces 11 and 12; retainer plates 9 each having an engagement projection 16 fitted in the engagement groove 15; and a number of cylindrical rollers 3 as rolling elements that are trapped between the facing raceway surfaces 5 and 11/6 and 12 and movable in a circulation path.

In this linear motion rolling guide unit, the end caps 7 attached to the longitudinal ends of the casing 4 have end seals 20 fitted to the end surfaces thereof. Under seals 22 are attached to the underside of the casing 4 and the end caps 7. The end caps 7 are mounted to the both ends of the casing 4 by driving screws into threaded-mounting holes. The interior side of each end cap 7 is formed, on each side, with direction changing passages 25, 26, by which a number of cylindrical rollers 3 circulating through the raceways between the casing 4 and the track rail 1 can change their directions.

Figure 2:
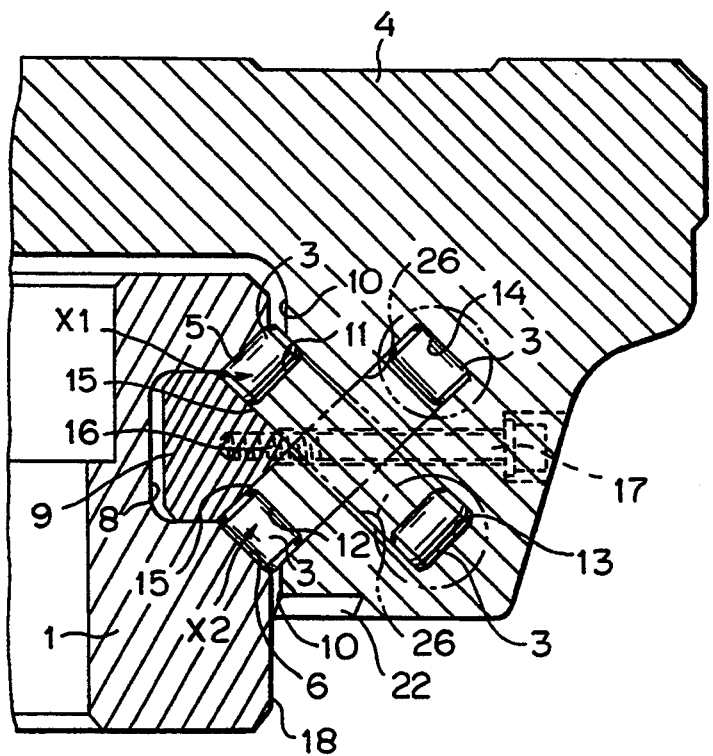
FIG. 2 is a fragmentary cross section taken along the line A—A of FIG. 1.
Figure 3:
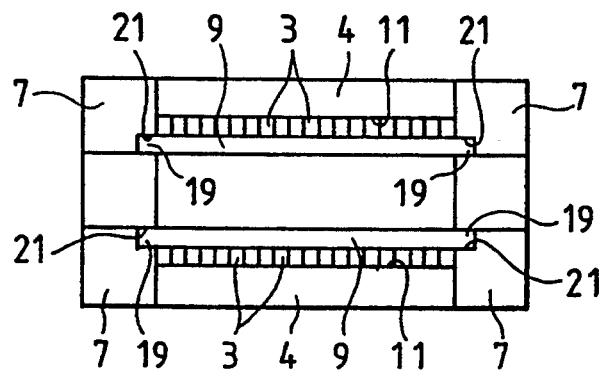
FIG. 3 is a bottom view of the 4-raceway endless linear motion rolling guide unit shown in FIG. 1.

The linear motion rolling guide unit of this invention positions the end caps 7 with respect to the casing 4 by utilizing the retainer plates 9 secured to the casing 4 by bolts 17, as shown in FIG. 2. FIG. 3 is a bottom view of the linear motion rolling guide unit.

In this linear motion rolling guide unit, the whole length of the retainer plate 9 is made longer than the total length of the casing 4, and the end caps 7 are formed with a positioning groove 21. In the assembly of the casing 4 and the end caps 7, the end caps 7 are placed in contact with the ends of the casing 4 and the ends 19 of the retainer plate 9 are fitted into the positioning grooves 21 of the end caps 7. In this condition, the end caps 7 are secured to the casing 4. The engagement grooves 15 formed in the casing 4 are cut in a V shape at the same time that the raceway surfaces 11, 12 are formed. The engagement projection 16 of the retainer plate 9 is fitted into the V-shaped groove in the casing 4 and the retainer plate 9 is fixed to the casing 4 by bolts 17.

Because the retainer plate 9 is positioned correctly with respect to the casing 4 and secured to the V-shaped groove in the casing 4, which is cut simultaneously with the raceway surfaces 11, 12, and because the end caps 7 are positioned with respect to the retainer plate 9, it is possible to correctly position the end caps 7 with respect to the casing 4. This in turn makes it possible to construct with precision the endless circulation path, which consists of the loaded raceway formed by the track rail 1 and the casing 4, the direction changing passages formed in the end caps 7, and the return passages 13, 14 formed in the casing 4. As a result, the cylindrical rollers 3 can be rotated and moved smoothly through the endless circulation path and the gap between the track rail 1 and the slider 2 can be sealed in good condition.

Figure 4:
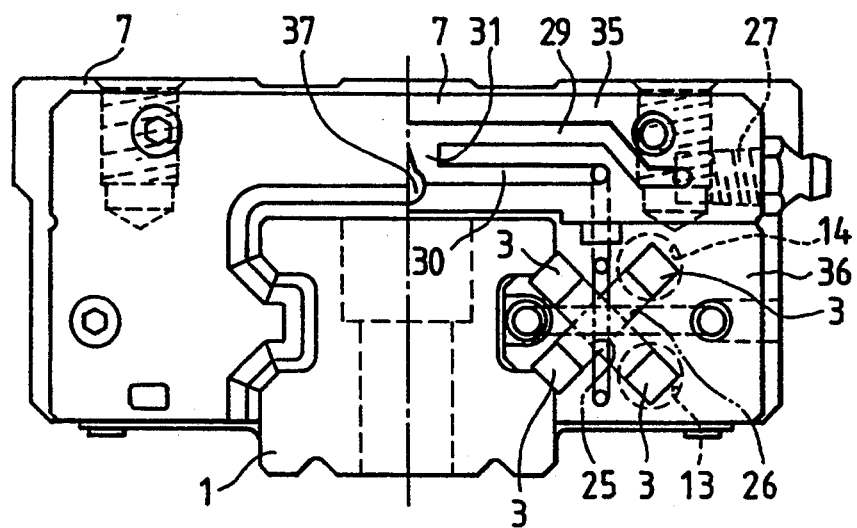
FIG. 4 is an end view of an end cap attached to the 4-raceway endless linear motion rolling guide unit shown in FIG. 1.
Figure 8:
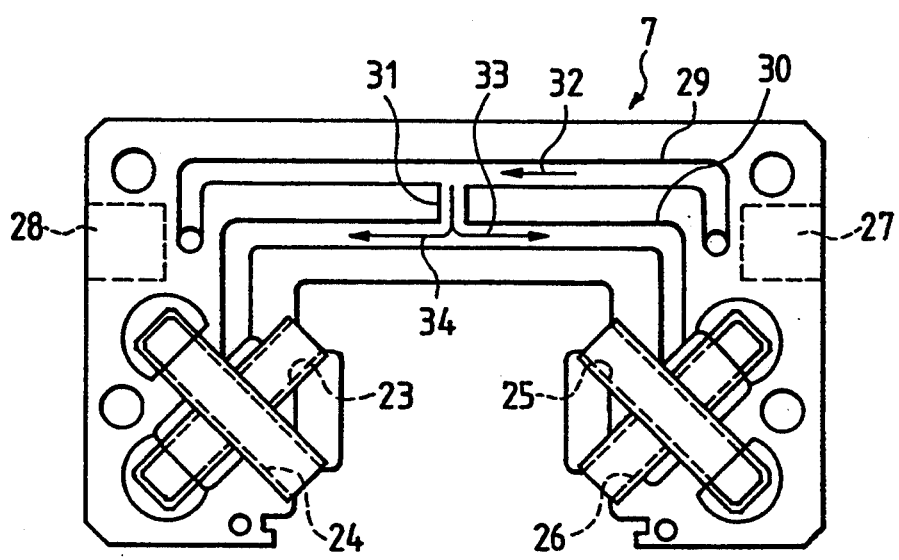
FIG. 8 is an end view of the end cap in the conventional linear motion rolling guide unit, as seen from the casing side.

FIG. 4 is an end view of the end cap 7. As shown in FIG. 4, the end cap 7 is shaped like a gate and consists of an upper portion 35 located above the track rail 1 and a pair of side portions 36 facing the side wall surfaces 18 of the track rail 1. The side portions 36 of the end cap 7 are each provided with the direction changing passages. The construction of the side portions 36 is the same as explained and shown in FIG. 8 and thus their explanation is not given here.

Figure 5:
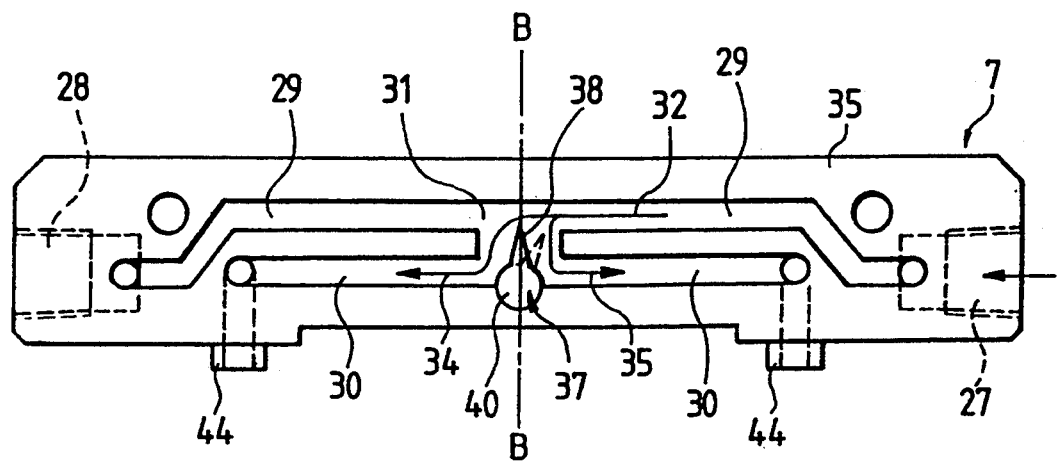
FIG. 5 is an end view of an upper portion of the end cap of FIG. 4, as seen from the casing side.
Figure 6:
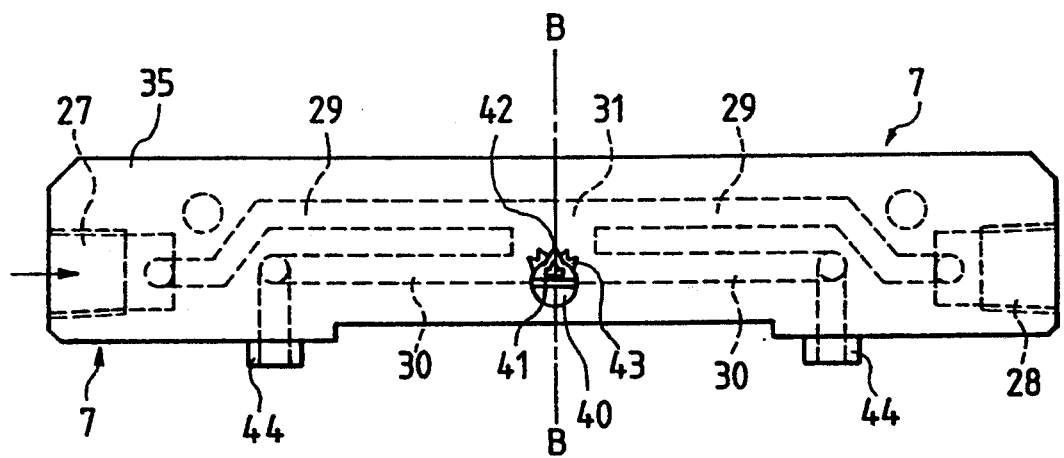
FIG. 6 is an end view of the upper portion of the end cap of FIG. 4, as seen from the side opposite the casing side.
Figure 7:
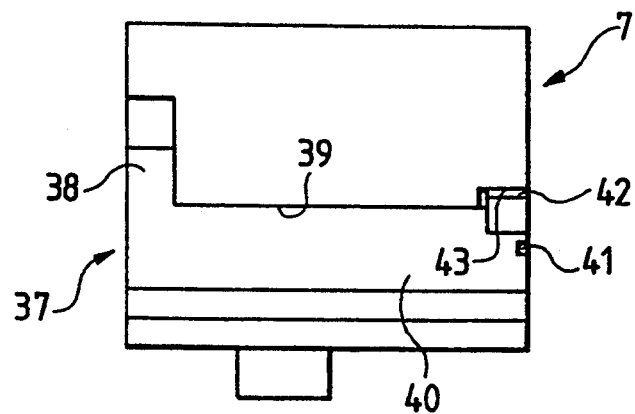
FIG. 7 is a cross section taken along the line B—B of FIG. 5 and 6.

FIGS. 5, 6 and 7 show the upper portion of the end cap 7. FIG. 5 is an end view as seen from the casing 4 side. FIG. 6 is an end view as seen from the opposite side. FIG. 7 is a cross section taken along the line B—B of FIG. 5 and 6. The upper portion 35 of the end cap 7 is formed with oil supply ports 27, 28 and oil grooves 29, 30, 31 for supplying lubricating oil to the raceways X1, X2 formed between the track rail 1 and the slider 2, i.e. between the raceway surfaces 5 and 11 and between raceway surfaces 6 and 12.

The oil groove in the upper portion 35 comprises: a first oil groove 29 that extends from the oil supply ports 27, 28 on the left and right side toward the center of the end cap 7; a second oil groove 30 communicating with the raceways X1, X2 on the left and right side of the track rail; and a communicating oil groove 31 that connects the first oil groove 29 and the second oil groove 30. The communication oil groove 31 is located at the center line of the end cap 7. The second oil groove 30 changes its direction on the way from the horizontal direction to the downward direction and extends to an annular projections 44 formed on the underside of the upper portion 35. The upper surface of the side portion 36 of the end cap 7 is formed with annular recesses (not shown) that receive the annular projections 44. Hence, when the upper portion 35 and the side portions 36 of the end cap 7 are connected together, the second oil groove 30 communicates with the oil grooves formed in the side portions 36 through the engaged annular recesses and projections 44. The oil grooves in the side portions 36 communicate with the raceways X1, X2.

The oil groove 30 is provided with a flow regulating valve 37. The flow regulating valve 37 comprises a valve body 38 disposed in the communicating oil groove 31, a valve shaft 40 rotatably fitted in a shaft hole 39 formed in the end cap 7 and having the valve body 38 formed integral with one end thereof, a driver groove 41 formed at the other end of the valve shaft 40, and an engagement claw 42 for engagement with engagement teeth 43 formed around the shaft hole 39. The engagement claw 42 has elasticity. When a screwdriver (not shown) is fitted in the driver groove 41 to turn the valve shaft 40, the engagement claw 42 engages the engagement teeth 43 to fix the valve shaft 40 and the valve body 38 at a specified angle. This flow regulating valve 37 can be adjusted in several steps.

The oil supply ports 27, 28 are provided on the right and left side surfaces, respectively, of the end cap 7 so that lubricating oil can be supplied from either side. The lubricating oil supplied from one oil supply port 27 passes, as indicated by arrows 32, 34, 35, through the first oil groove 29 formed in the end cap 7 and is branched by the valve body 38 installed in the communicating oil groove 31 to flow into the second oil groove 30 and from there to the raceways X1, X2 on the left and right sides formed in the side wall surfaces 18 of the track rail 1.

When this linear motion rolling guide unit is used in the horizontal attitude, the flow regulating valve 37 is adjusted so that the valve body 38 is at the neutral position depicted by a solid line. In this condition, the lubricating oil fed from the oil supply port 27 flows through the first oil groove 29 in the direction of arrow 32 and is then branched evenly by the valve body 38, so that equal amounts of lubricating oil are supplied to the left and right raceways X1, X2. When, however, this linear motion rolling guide unit is used in an inclined attitude, for example, with the right side tilted downward in FIG. 5 and with the valve body 38 remaining at the neutral position, the lubricating oil supplied from the oil supply port 27 will be affected by gravity and flow in a greater amount in the direction of arrow 35, resulting in an insufficient amount of oil flowing in the direction of arrow 34.

Therefore, when the linear motion rolling guide unit is used with the right side inclined downward, the flow regulating valve 37 is adjusted until the valve body 38 is rotated to the position indicated by a broken line. With the flow regulating valve 37 adjusted in this way, the cross sectional area in the oil groove on the right side of the valve body 38 is smaller than the area on the left side, limiting the flow of lubricating oil in the direction of arrow 35 while at the same time promoting the flow in the direction of arrow 34. As a result, the lubricating oil is supplied evenly to both of the left and right raceways X1, X2, realizing good lubrication.

I claim:

1. In a linear motion rolling guide unit comprising:
   a track rail having first raceway surfaces formed one on each longitudinally extending side wall surface thereof;
   a casing slidable relative to the track rail and having second raceway surfaces formed at positions facing the first raceway surfaces,
   the casing also having return passages formed therein, the first raceway surfaces of the track rail and the second raceway surfaces of the casing forming raceways therebetween;
   end caps mounted to the longitudinal ends of the casing, each of the end caps having direction clanging passages; and
   rolling elements rolling and circulating through the raceways, the direction changing passages and the return passages;
   said linear motion rolling guide unit characterized in:
   that each of the end caps is formed with oil supply ports for introducing lubricating oil, with oil grooves extending from the oil supply ports to the central portion of the end cap, with communicating oil grooves merging the oil grooves at the central portion, and with branching oil grooves for branching the communicating oil grooves and connecting them to the raceways on both sides; and
   that flow regulating valves are installed in the communicating oil grooves to distribute lubricating oil to the branching oil grooves that communicate with the raceways.

2. A linear motion rolling guide unit according to claim 1, characterized in:
   that the cross sectional areas of the branching oil grooves communicating with the raceways are different from each other.

3. A linear motion rolling guide unit according to claim 1, characterized in:
   that the flow regulating valves can supply, independently of each other, lubricating oil to the raceways.

4. A linear motion rolling guide unit according to claim 1, characterized in:
   that the flow regulating valves adjust the amount of openings connected to the branching oil grooves communicating with the raceways located at higher positions and the amount of openings connected to the branching oil grooves communicating with the raceways located at lower positions to balance the amounts of lubricating oil supplied to the raceways located at higher and lower positions.

5. A linear motion rolling guide unit according to claim 1, characterized in:
   that the cross sectional areas of the branching oil grooves communicating with the raceways located at higher positions and the cross sectional areas of the branching oil grooves communicating with the raceways located at lower positions are different from each other in order to balance the amounts of lubricating oil supplied to the raceways located at the higher and lower positions.

6. A linear motion rolling guide unit according to claim 1, characterized in:
   that the flow regulating valves each comprise: a valve body installed in the communicating oil grooves; a valve shaft rotatably fitted in a shaft hole formed in the end cap and having the valve body formed integral with one end thereof; a driver groove formed at the other end of the valve shaft; and an engagement claw that engages engagement teeth formed around the shaft hole.

* * * * *